Patented Nov. 28, 1939

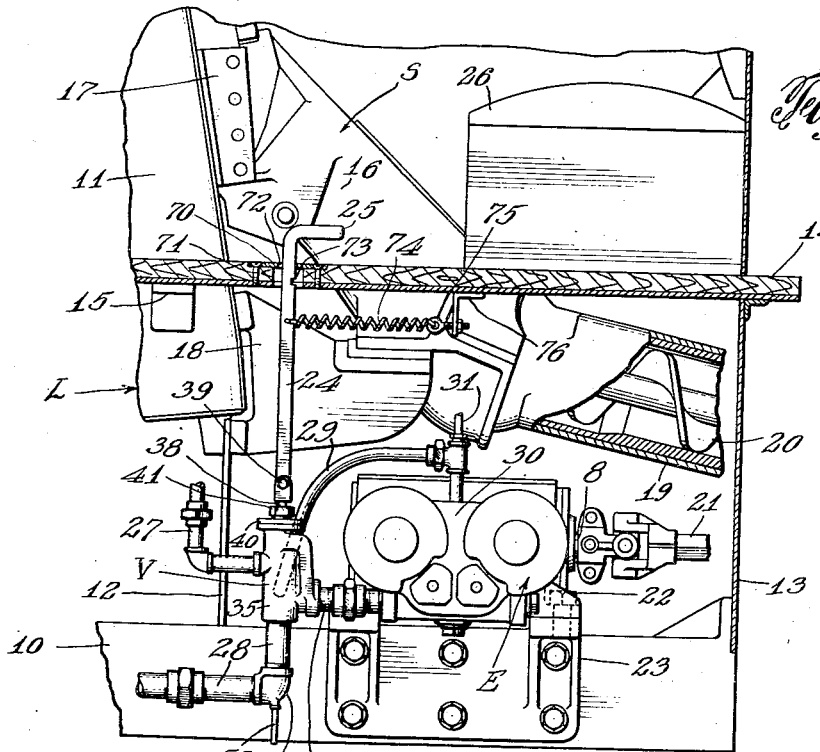

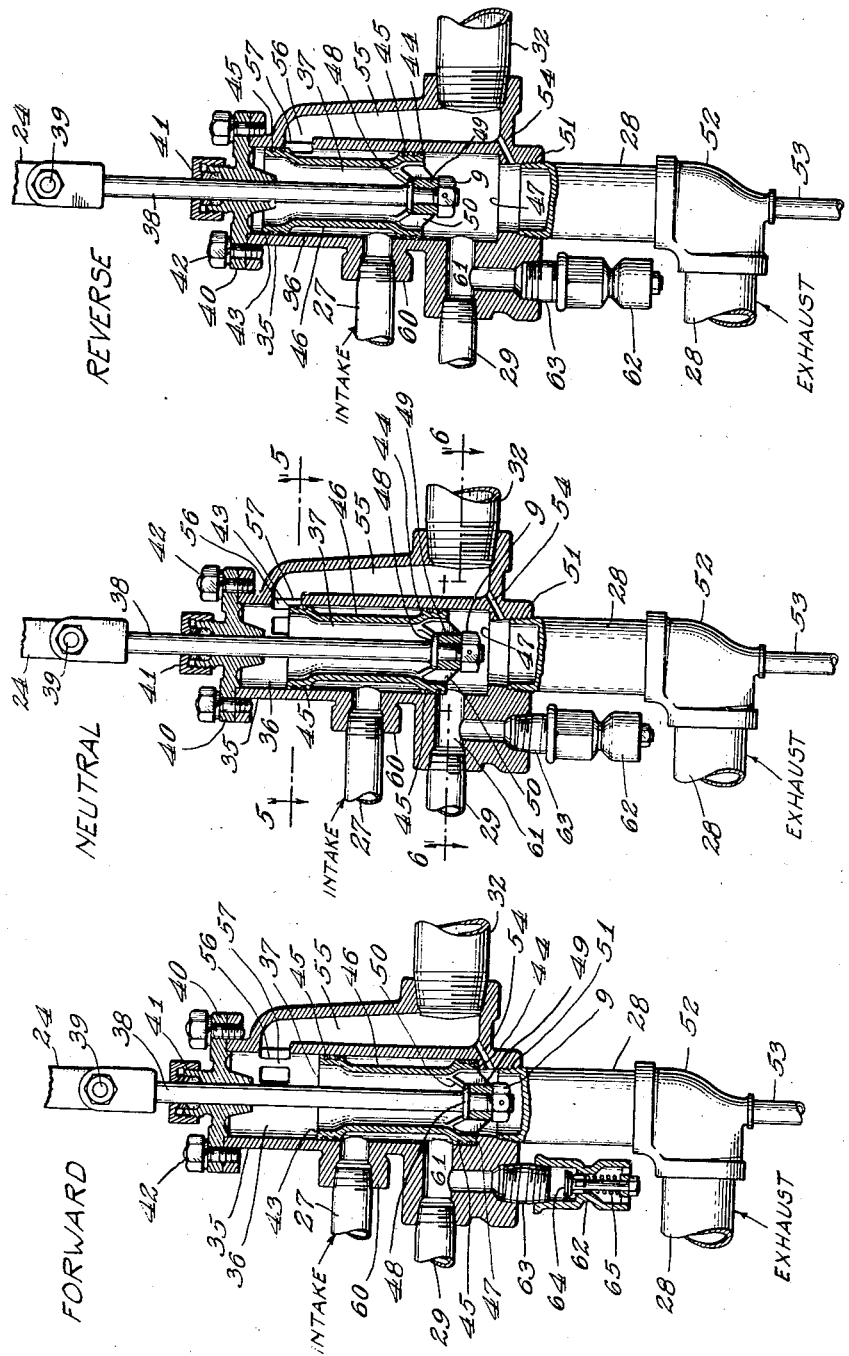

2,181,840

UNITED STATES PATENT OFFICE

2,181,840

CONTROL VALVE

Edwin Archer Turner, New York, N. Y., and Charles R. Davison, Erie, Pa., assignors, by mesne assignments, to The Standard Stoker Company, Inc., New York, N. Y., a corporation of Delaware Application August 19, 1936, Serial No. 96,804

7 Claims. (Cl. 105—37)

This invention relates to a control valve for locomotive auxiliary devices, such as stoker drive engines.

In many locomotive stoker installations, the driving engine thereof is rigidly mounted upon the frame of the locomotive at a considerable distance below the cab deck. The valve device for controlling the admission and exhaust of steam to and from the driving engine is disposed adjacent the engine and arranged for manual operation by means of a rod which passes through the cab deck to a point in the cab within convenient reach of the fireman.

Heretofore, the construction of the stoker engine control valve was such that the movable valve element thereof was maintained in the uppermost position of its travel in order to cause forward operation of the stoker engine. This necessitates the use of a latch device for holding the valve operating rod in its uppermost position to the cab deck. With such an arrangement it will be apparent that, incident to vibration or other movement of the cab deck with respect to the locomotive frame, a severe strain is placed upon the valve operating rod, often causing the rod to break. Upon fracture of the operating rod, the movable valve element becomes free to move downwardly in the valve body to a position which reverses the admission of steam to the driving engine so that the latter is only operable in a reverse direction, resulting in a stoker failure.

The principal object of this invention is to prevent and to overcome stoker failures of this nature by the provision of an improved control valve comprising an operating rod which during normal operation of the stoker driving engine is free of any positive connection with the cab deck whereby the strains and stresses attendant with the operation of the locomotive are not transmitted to the rod.

As a further object thereof, the present invention contemplates the provision of an improved control valve in which the movable valve element during normal operation of the stoker driving engine is at rest, by reason of its weight, against a seat or stop in the body of the control valve so that in the event breakage of the operating rod should occur, the movable valve element may remain in a position to admit steam or other pressure fluid to the driving engine for continuing normal operation of the stoker.

As another object thereof, the present invention contemplates providing an improved control valve having a positive neutral position whereby any pressure fluid in the intake port that may leak through the movable valve element is vented to atmosphere, thereby preventing passage of pressure fluid to the driving engine when the control valve is in such neutral position.

A still further object of the invention resides in the provision of a control valve having a cylindrical bore and a cover over one end of said bore through which cover passes a stem of the movable valve element, the under side of the cover at all times being subjected to exhaust pressure only.

Other objects are to provide an improved control valve of such construction that its installation may easily and conveniently be made in the piping system heretofore provided for control valves of prior construction; to provide a novel arrangement of ports and passages for the admission and exhaust of pressure fluid through the control valve; to provide a novel and efficient system for draining any condensate in the control valve, and to otherwise improve upon the construction and operation of the control valve as will hereinafter become more apparent from the description when read in connection with accompanying drawings in which the control valve has been embodied for use in connection with a driving engine of a well known locomotive stoker.

Fig. 1 of the drawings represents a longitudinal section through the rear portion of a locomotive adjacent the fireman's side, illustrating the invention in side elevation;

Figures 2, 3 and 4 are central vertical sections through the control valve of the present invention with certain portions shown somewhat diagrammatically, each view showing the control valve in successive operative positions as indicated by the legends; and Figures 5 and 6 are true sectional views of the control valve taken on the lines 5—5 and 6—6, respectively, of Fig. 3.

On these drawings, the locomotive is indicated by L and comprises a frame 10 above which is supported a boiler backhead 11 by means of an expansion plate 12. To the rear of the frame 10, another expansion plate 13 is secured for supporting the cab deck 14. The cab deck 14 may be further supported upon a bracket 15 carried by the boiler backhead 11. The stoker is shown at S and includes a delivery conduit 16 supported at its upper end from the backhead 11 by a bracket 17 and at its lower end by the bracket 18. The lower end of the delivery conduit 16 flexibly supports the forward end of another conduit 19 leading forwardly from the tender (not shown). A conveyor screw, such as 20, extends through the conduits 16, 19 and conveys coal therethrough for delivery into a firebox contained within the boiler.

The conveyor screw 20 is operated by means of gearing (not shown) driven by shafting 21 having an operative connection with the stoker drive engine E. The engine E is of the multi-cylinder, double acting type and utilizes steam or other pressure fluid as an operating medium therefor. This engine is rigidly secured by bolts such as 22 to a bracket 23 which is securely fastened to the locomotive frame 11. The admission of steam or other pressure fluid to the driving engine E and the exhausting of steam therefrom are controlled by a valve V having an inextensible rod 24 which extends upwardly through the cab deck 14 and terminates in the handle 25 disposed adjacent the fireman's seat box 26 for convenience of operation.

Steam from the locomotive boiler is conducted to the valve V by means of an intake pipe 27 while the steam exhausted by the engine E passes through the valve V and thence through pipe 28 to the locomotive front end. During normal stoker operation the valve V conducts steam from the intake pipe 27 to the pipe 29, the latter having a connection with the steam chest 30 of the engine and being also provided with a nipple 31 which is suitably connected with a mechanical lubricator for the purpose of supplying a small quantity of oil at regular intervals to steam chest 30 for lubricating the cylinder walls. In the normal operation of the stoker steam exhausted from the engine E passes from the pipe 32 into the valve V and thence to pipe 28. Reversal of the stoker engine E is accomplished by movement of the rod 24 as will hereinafter be described, whereby the valve V admits steam from pipe 27 to pipe 32, the steam exhausting through pipe 29, valve V and thence through pipe 28.

Referring now to Figures 2 to 6, inclusive, illustrating the detailed construction of the control valve V, it will be apparent that this valve consists of an elongated body member 35 having a cylindrical bore 36 therein. Within the cylindrical bore 36 a movable valve element 37 is mounted and it is arranged for movement within the body 35 by means of a stem 38 which has an operative pivotal connection as at 39 with the rod 24. The upper end of the valve body 35 is covered by a cap 40 having a stuffing box 41 through which passes the stem 38. Bolts 42 secure the cap to the body. The movable valve element 37 is in the form of a spool having an upper enlarged end 43 and a lower enlarged end 44. In each enlarged end 43, 44 of the movable valve element 37, rings such as 45 are provided for insuring a pressure-tight seal between the enlarged ends 43, 44 of the valve and the reduced portion 46 thereof.

The lower end of the body member 35 is provided with a seat 47 upon which the lower enlarged end 44 of the valve element 37 is adapted to rest, as shown in Fig. 2. Adjacent the lower end 44 of the valve 37 the stem 38 is provided with a shoulder 48 seating against a central boss 49 which is formed with the valve element 37 and connected to the cylindrical walls thereof by ribs 50 (as clearly shown in Fig. 6). The stem 38 passes through the central boss 49 and its lower end is engaged by a nut 9 drawn tightly against the under side of the central boss 49 to form a secure connection between the stem 38 and the movable valve element 37.

By connecting the stem 38 to the valve element 37, it will be noted that the length of the control valve is maintained as small as possible without reducing the cross sectional area interiorly of the valve element 37 through which the exhausted steam must pass.

Below the seat 47 the valve body 35 is threaded as at 51 to receive the exhaust pipe 28. Elbow 52 in the exhaust pipe 28 is provided with a drainage tube 53 through which condensate is conducted to a suitable point of discharge. Immediately above its threaded portion 51 and beneath the seat 47 the valve body 35 is provided with another drain passage 54 which establishes communication between the exhaust pipe or passage 28 and the lowermost point of a port 55 extending vertically along a side of the valve body 35. Adjacent the lower portion of the port 55 the valve body is threaded to receive pipe 32 which, during normal stoker operation, conducts exhaust steam from the engine E to the pipe 28.

At the upper portion of the valve body the passage 55 opens inwardly, as at 56, into the cylindrical bore 36 for conducting the exhaust steam through the valve element 37 during normal stoker operation. Since, as will be hereinafter more fully described, the upper end 43 of the movable valve element 37 must at times pass across the inward opening 56 of the passage 55 and since the passage must be of substantial cross-sectional area, a series of bridge walls 57 is provided, as best shown in Fig. 5, for the purpose of maintaining the rings 45 within their respective grooves in the upper end 43 of the movable valve element 37.

The steam intake pipe 27 is threaded into a boss 60 and admits steam between the enlarged ends 43, 44 of the movable valve element for selective distribution into either of the pipes 29 or 32. As illustrated in Fig. 2, the normal or forward operation of the stoker engine E is attained by moving the valve element 37 to a position whereby its lower end 44 rests upon the seat 47. With the movable valve element 37 in this position it will be apparent that steam passing from the intake 27 will be confined between the enlarged ends 43, 44 of the valve 37 and thence will pass through port 61 into the pipe 29 for admission to the steam chest 30.

At a suitable distance below the lowermost point of the port 61 a drain valve 62 is connected to the valve body 35 by means of a coupling 63. The drain valve 62 comprises a valve element 64 which, in the absence of any substantial pressure in port 61, is maintained in an open position by means of a spring 65. Thus any accumulated condensate in pipes 27, 29 will flow out through the drain valve 62 before operation of the stoker engine is started. As soon as steam is admitted to the intake 27 and port 61, the pressure of steam will cause the valve element 64 to close, thereby preventing leakage of steam through the drain valve 62 during normal stoker operation.

It will be apparent from Fig. 1, wherein the control valve V is in a position to cause forward operation of the engine E, that the rod 24 is free of any positive connections with the cab deck 14 but merely protrudes freely therethrough. Thus, as relative movement between the frame 10 and the deck 14 occurs, the rod 24 is free to move with respect to the deck 14 and therefore will not transmit any stresses to the valve stem 38 which might cause breakage thereof. It will be further observed from Fig. 2 that when the control valve of the described construction is utilized, breakage of the valve stem 38 or the rod 24 for any reason will not result in a stoker failure because the movable valve element 37 is pressure-balanced on all sides and will normally come to rest in the position illustrated in Fig. 2, thereby insuring admission of steam to the engine E for operating the latter normally.

Occasionally it is desirable to reverse the direction of rotation of the conveyor screw 20 in order to release extraneous matter lodged between the flight of the screw and the stoker conduit walls. In order to accomplish this reversal, the fireman grasps the handle 25 and pulls the rod 24 upwardly until the movable valve element 37 is in the position illustrated in Fig. 4, whereupon steam from the intake pipe 27 will pass around the reduced portion 46 of the valve element and through the openings 56 into the port 55. The live steam then enters the steam chest 30 through pipe 32 and is admitted, through suitable valves in the engine E in a manner well known, to cause the crank shaft 3 to be rotated in reverse direction. During reverse operation of the engine E the pipe 29 serves to exhaust steam from the chest 30. The steam entering pipe 29 passes into port 61 and thence beneath the movable valve element 37 into the exhaust pipe 28. It will be apparent from Fig. 4 that a certain amount of live steam will escape through the passage 54 into the exhaust pipe 28. However, since reverse operation of the stoker engine is only for short infrequent intervals, the amount of steam thus lost is very small.

As in the forward running position of the engine, the operating rod 24 is not in any way positively connected to the cab deck during reversal of the stoker engine, it being necessary for the fireman to retain the handle 25 in its uppermost position in order that reversed operation of the engine be continued. As soon as the handle 25 is released, the valve element 37 will of itself move downwardly and cause the stoker engine to operate normally. This feature is of particular advantage in locomotive stoker operation where it has been found in past practice that when a positive lock is used to retain the valve in a reversing position, the fireman frequently fails to return the valve to its normal position until lowering of steam pressure caused by poor fire conditions brings to his attention the reverse operation of the stoker.

If upon continued reversal of the conveyor screw 20 the extraneous material is not released, it is customary for the fireman to shut off the supply of steam to the intake pipe 27 and then, as a precautionary measure, place the movable valve element 37 in a neutral position. Under these conditions the fireman may then attempt to release the clog manually without any danger. In Fig. 3 the movable valve element 37 is shown in the neutral position and it will be apparent that any steam which may have entered the intake pipe 27 will be confined between the enlarged ends 43, 44 of the movable valve element 37. The arrangement is such that at least one ring 45 provides an effective seal against steam leakage. However, should the rings become slightly worn, any leakage of steam past the enlarged ends 43, 44 of the movable valve element 37 will always be vented to atmosphere through the exhaust pipe 28 and the leakage would not, therefore, cause the engine to operate.

Since the fireman must direct his manual efforts to release the clog, means is provided for maintaining the operating rod 24 in the neutral position illustrated in Fig 3. This means comprises a latch plate 70 which is secured to the cab deck 14 by means of screws 71 and having therein an opening 72 through which passes the upper end of the rod 24. This rod is provided with a notch 73 which in calibrated to engage the latch plate 70 when the movable valve element 37 is in the position as shown in Fig. 3. The notch 73 and latch plate 70 are maintained in engaging position by a spring 74, one end of which is secured to the rod 24, the other end being fastened to an eye bolt 75 which is threaded into an angle iron 76 on the under side of the cab deck 14. The spring 74 also serves to stabilize the rod 24 against excessive angular fore and aft movement about pivot 39 when the movable valve element is in the positions shown in Figures 1, 2 and 4.

Because it is essential to maintain the operating rod 24 in the position illustrated in Fig. 3 by means of the latch plate 70, it will be apparent that as relative movement between the deck 14 and frame 10 occurs, the movable valve element 37 will reciprocate slightly within the valve body 35. This movement is not objectionable, however, because the movable valve element is free to slide a considerable distance to either side of its neutral position without striking the seat 47 or the cap 68. Furthermore, should the valve element 37 be moved by vibration of the stem 38 a distance sufficient to cause its reduced portion 46 to establish communication with port 61 or port 55, any steam confined between the enlarged ends 43, 44 of the valve element 37 will be vented to the exhaust pipe 28 and will not pass into either of the pipes 29, 32.

Whenever it is desired to move the valve element 37 from its neutral position into either of its other positions, the fireman pushes the rod 24 forwardly, it being clear that the rod 24 is free to move about its pivotal connection 39, to cause disengagement of the latch plate 70 with notch 71, whereupon the rod may be pulled upward to place the valve element 37 in a reverse position as shown in Fig. 4, or, if desired, the rod 24 may be pushed downwardly to place the valve element 37 in a forward position as shown in Fig. 2

Those familiar with the art will readily understand that a control valve constructed according to this invention will be efficient in operation; that the construction affords adequate protection to a stoker operator by reason of its positive neutral position; and that this construction prevents breakage of the valve stem and other failures attendant with control valves of prior construction.

We claim:

1. In a locomotive having a frame and a cab deck above said frame supported thereby, the combination of a control valve for a reversible engine supported on a part of the locomotive beneath said deck and having a slight movement with respect to said cab deck during normal operation of the locomotive, said control valve including a body member having therein a pressure fluid intake passage and a pair of discharge ports arranged to selectively receive pressure fluid from said intake passage, one of said discharge ports communicating with said engine for operating it in a forward direction and the other of said discharge ports communicating with said engine for operating it in a reverse direction, a movable valve element for selectively establishing communication between said intake passage and either of said ports, and an inextensible rod operatively connected to said movable valve element and extending upwardly through said cab deck, said rod being loosely related and movable with respect to said deck when said movable valve element is in a position to establish communication between said intake port and the port communicating with the engine for operating it in a forward direction.

2. In a locomotive having a frame and a cab deck above said frame supported thereby, the combination of a control valve for a reversible engine supported on a part of the locomotive beneath said deck and having a slight movement with respect to said cab deck during normal operation of the locomotive, said control valve including a body member having therein a pressure fluid intake passage and a pair of discharge ports arranged to selectively receive pressure fluid from said intake passage, one of said discharge ports communicating with said engine for operating it in a forward direction and the other of said discharge ports communicating with said engine for operating it in a reverse direction, a movable valve element for selectively establishing communication between said intake passage and either of said ports, an inextensible rod operatively connected to said movable valve element and extending upwardly through said cab deck, said rod being loosely related and movable with respect to said deck when said movable valve element is in a position to establish communication between said intake port and the port communicating with the engine for operating it in a forward direction, and means for securing said rod with respect to said cab deck upon movement of said valve element to a position for interrupting communication between said intake passage and said ports.

3. In a locomotive having a frame and a cab deck above said frame supported thereby, the combination of an engine control valve supported on a part of the locomotive beneath said deck and having a slight movement with respect to said cab deck during normal operation of the locomotive, said control valve including a body member having a vertically directed cylindrical bore therein, a valve element in said cylindrical bore for vertical movement therein, said valve element being selectively movable to positions for causing forward and reverse engine operation, and means including a rod operatively connected to said valve element for moving the same to its operative positions, said rod passing freely through said cab deck and being vertically supported by said valve element only when the latter is in a position to cause engine operation in a forward direction.

4. In a locomotive having a frame and a cab deck above said frame supported thereby, the combination of an engine control valve supported on a part of the locomotive beneath said deck and having a slight movement with respect to said cab deck during normal operation of the locomotive, said control valve including a body member having a vertically directed cylindrical bore therein, a valve element in said cylindrical bore for vertical movement therein, said valve element being selectively movable to positions for causing forward and reverse engine operation, said valve element also having a neutral position intermediate the first and second named positions for interrupting engine operation, means including a rod operatively connected to said valve element for moving the same to its operative positions, said rod passing freely through said cab deck and being vertically supported by said valve element only when the latter is in a position to cause engine operation in a forward direction, and means for securing said rod against movement with respect to said cab deck upon placement of said valve element in its neutral position.

5. In a locomotive having a frame and a cab deck above said frame supported thereby, the combination of a control valve for a reversible engine supported on the locomotive beneath the cab deck and having slight movement with respect to said cab deck during normal operation of the locomotive, said control valve including a body member having a vertically directed cylindrical bore therein, a valve element in said cylindrical bore for vertical movement therein, said valve element being movable to positions for causing forward and reverse operation of the engine and to a neutral position, said valve element being movable through force of gravity from neutral and reverse position to position for forward operation of the engine, and means including a rod operatively connected to said valve element for raising the same to its neutral and reverse positions, said rod passing freely through said cab deck and being vertically supported by said valve element only when the latter is in a position to cause engine operation in a forward direction.

6. In a locomotive having a frame and a cab deck above said frame supported thereby, the combination of a control valve for a reversible engine supported on the locomotive beneath the cab deck and having slight movement with respect to said cab deck during normal operation of the locomotive, said control valve including a body member having a vertically directed cylindrical bore therein, a valve element in said cylindrical bore for vertical movement therein, said valve element being movable to positions for causing forward and reverse operation of the engine and to a neutral position, said valve element being movable through force of gravity from neutral and reverse position to position for forward operation of the engine, means including a rod operatively connected to said valve element for raising the same to its neutral and reverse positions, said rod passing freely through said cab deck and being vertically supported by said valve element only when the latter is in a position to cause engine operation in a forward direction and means for securing said rod to said cab deck for retaining said valve element in its neutral position.

7. In combination, a pressure fluid operated reversible engine, a fluid supply line communicating with said engine for operating it in a forward direction, a second fluid supply line communicating with said engine for operating it in a reverse direction, a control valve, said valve including a body member having a vertically directed cylindrical bore therein and having a pressure fluid intake port, a pressure fluid discharge port communicating with one of said fluid supply lines and a pressure fluid discharge port communicating with the other of said fluid supply lines, a valve element in said cylindrical bore for vertical movement therein, said valve element being movable to positions for causing forward and reverse operation of the engine and to a neutral position, said valve element being movable through force of gravity from neutral and reverse position to position for forward operation of the engine.

E. ARCHER TURNER.
CHARLES R. DAVISON.